United States Patent [19]

Brown et al.

[11] Patent Number: 4,721,605

[45] Date of Patent: Jan. 26, 1988

[54] SELECTIVE REMOVAL OF METALS FROM AQUEOUS SOLUTIONS WITH DITHIOPHOSPHINIC ACIDS

[75] Inventors: Timothy J. Brown; William A. Rickelton, both of Niagara Falls, Canada; Richard J. Boyle, Somerset, N.J.

[73] Assignee: American Cyanamid Company, Stamford, Conn.

[21] Appl. No.: 758,603

[22] Filed: Jul. 24, 1985

[51] Int. Cl.$^4$ .................. C01G 3/00; C01G 51/00; C01G 53/00

[52] U.S. Cl. ...................... 423/24; 423/100; 423/139; 423/157; 423/DIG. 14; 75/101 BE; 75/117; 75/118 R; 75/119; 75/120; 75/121; 210/684; 210/685; 210/687

[58] Field of Search .............. 75/107 BE, 108, 117, 75/118 R, 119, 120; 423/24, 42, 100, 101, 139, 140, DIG. 14, 157, 158; 210/684, 685, 687

[56] References Cited

U.S. PATENT DOCUMENTS

| | | | |
|---|---|---|---|
| 3,336,133 | 8/1967 | Funatsu et al. | 75/119 |
| 3,432,277 | 3/1969 | Reesky | 23/357 |
| 3,966,569 | 6/1976 | Reinhardt et al. | 423/139 |
| 4,124,462 | 11/1978 | Reinhardt et al. | 204/119 |
| 4,332,684 | 5/1982 | De Schepper et al. | 423/139 |
| 4,348,367 | 9/1982 | Rickelton et al. | 423/139 |
| 4,353,883 | 12/1982 | Rickelton et al. | 423/139 |
| 4,374,780 | 2/1983 | Robertson | 423/139 |
| 4,382,016 | 5/1983 | Rickelton et al. | 502/213 |
| 4,490,338 | 12/1984 | De Schepper et al. | 423/139 |
| 4,619,816 | 10/1986 | Rickelton et al. | 423/139 |

FOREIGN PATENT DOCUMENTS

1126285  6/1982  Canada ........................ 260/458.8

OTHER PUBLICATIONS

Rickelton, W. A., Flett, D. S., West D. W., "Cobalt-Nickel Separation by Solvent Extraction with Bis(2,4,4-Trimethylpentyl)Phosphinic Acid." *Solvent Extraction and Ion Exchange,* 2(6), 815-838 (1984).

Chemical Abstract, 75(20):126044j.
Chemical Abstract No. 76(4):20804n.
Chemical Abstract No. 77(12):83088y.
Chemical Abstract No. 83(12):107669r.
Chemical Abstract No. 87(12):94864f.
Chemical Abstract No. 87(18):145050x.
Chemical Abstract No. 92(6):51311j.
Chemical Abstract No. 93(10):106096w.
Chemical Abstract No. 95(16):143266p.
Chemical Abstract No. 97(12):103489y.
Chemical Abstract No. 98(24):209176e.

*Primary Examiner*—Robert L. Stoll
*Attorney, Agent, or Firm*—Henry C. Jeanette; Michael J. Kelly; Frank M. Van Riet

[57] ABSTRACT

A process for the extraction of metals selected from the group consisting of zinc (II), silver (I), cadmium (II), mercury (II), nickel (II), cobalt (II), and copper (II) from an aqueous solution containing, in addition to said metals, metals selected from the group consisting of calcium (II) and magnesium (II) is disclosed. The process comprises contacting the aqueous solution having an equilibrium pH within the range of about 0.2 to about 3 with an extractant. The extractant comprises an organic-soluble dithiophosphinic acid or ammonium, alkali or alkaline earth metal salt thereof represented by the formula:

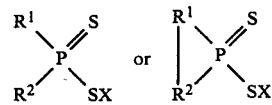

wherein $R^1$ and $R^2$ are the same or different and are selected from the group consisting of substituted or unsubstituted alkyl, cycloalkyl, alkoxyalkyl, alkylcycloalkyl, aryl, alkylaryl, aralkyl and cycloalkylaryl radicals having from about 2 to about 24 carbon atoms and X is either hydrogen or an ammonium, alkali or alkaline earth metal salt forming radical.

21 Claims, No Drawings

SELECTIVE REMOVAL OF METALS FROM AQUEOUS SOLUTIONS WITH DITHIOPHOSPHINIC ACIDS

FIELD

This invention relates to hydrometallurgy. More particularly, it relates to the recovery of selected metals from aqueous solutions by utilizing an extractant selective against the unwanted metals.

BACKGROUND OF THE INVENTION

It is known in the art that dialkyldithiophosphinic acids form metal complexes with some metals, e.g. zinc, cadmium, cobalt, nickel, copper and the like. This property has resulted in the use of these phosphinic acids as floatation agents and extraction agents.

For example, U.S. Pat. No. 3,966,569 (Reinhardt et al, Issued June 26, 1976) discloses the separation of iron, nickel, zinc, chromium and copper from a solution by three liquid extractions with different organic solutions. In the first extraction copper is removed, zinc and iron in the second, and nickel in the third. The solution remaining is then neutralized to induce precipitation of chromium. After the copper is removed, iron and zinc are removed utilizing an organophosphorous compounds, e.g., a dialkylphosphinic acid. After the removal of iron and zinc, nickel is removed utilizing a dialkyl dithiophosphoric acid. Among the general formulas disclosed for the dialkyl dithiophosphoric acid there is included a dialkyl dithiophosphinic acid.

U.S. Pat. No. 4,348,367 (Rickelton et al, issued Sept. 7, 1982) relates to a process for the extraction of cobalt (II) from an aqueous cobalt (II) bearing solution. In the process an organic-soluble phosphinic acid is utilized. U.S. Pat. No. 4,382,016 (Rickelton et al, issued May 3, 1983) discloses a composition for use in extraction comprising an inert material and an organophosphinic acid. U.S. Pat. No. 4,374,780 (Robertson, issued February 22, 1983) discloses 2,4,4-trimethylpentylphosphinic acid and its use as a selective extractant for cobalt (II) in aqueous cobalt (II)-bearing solutions containing nickel (II).

It is also known that phosphinic acids selectively extract zinc from calcium at a pH of 3 with the continued addition of base to maintain the pH.

None of the foregoing discloses the selective extraction of metals such as zinc, silver, cadmium, copper and the like, against metals such as calcium, magnesium and the like in a low pH, e.g. 0.2-3.0, aqueous solution without having to add additional base to maintain the pH. In many processes aqueous solutions are utilized. These solutions are derived from, e.g., water which can contain such metals as calcium, and magnesium. It is usually desirable to recover certain metals from these aqueous solutions which become deposited therein during a particular process. Thus, for example, in the rayon process zinc is used to control the coagulation of the rayon fibers during the spinning operation. The efficient recovery of zinc used in this process from aqueous solutions containing, for example, calcium, would be highly desirable.

Therefore, a welcome contribution to the art would be a method for the selective extraction of zinc, silver, cadmium, copper, nickel, cobalt and the like from aqueous solutions containing these metals as well as calcium, magnesium and the like. Such a method is provided by this invention.

SUMMARY OF THE INVENTION

This invention provides a process for the extraction of metals selected from the group consisting of zinc (II), silver (I), cadmium (II), mercury (II), nickel (II), cobalt (II) and copper (II) from an aqueous solution containing, in addition to said metals, metals selected from the group consisting of calcium (II) and magnesium (II) comprising contacting said solution having an equilibrium pH within the range of about 0.2 to about 3.0 with an extractant comprising an organic-soluble dithiophosphinic acid or ammonium, alkali or alkaline earth metal salt thereof represented by the formula:

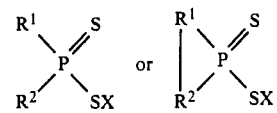

wherein $R^1$ and $R^2$ are the same or different and are selected from the group consisting of substituted alkyl, cycloalkyl, alkoxyalkyl, alkylcycloalkyl, aryl, alkylaryl, aralkyl and cycloalkylaryl radicals having from about 2-24 carbon atoms and X is either hydrogen or an ammonium, alkali or alkaline earth metal salt forming radical.

DETAILED DESCRIPTION OF THE INVENTION

In carrying out the processes of the invention, extraction techniques believed compatible with an extractant comprising an organodithiophosphinic acid include, but are not limited to, liquid-liquid extraction employing either mixer settlers or columns, such as the reciprocating-plate extraction column, pulse columns or columns employing rotating impellers; packed beds of supported extractants wherein the support can be an inert material, such as diatomaceous earth, or a polymer such as cross-linked polystyrene, the latter approach being more explicity described in U.S. Pat. No. 3,960,762 issued to Kroebel et al in 1976; liquid membrane extraction as described by Bock, Valint and Hayworth of Exxon Research and Engineering Company and selective supported membrane extraction as described by Obermayer, Nichols, Allen and Caron of the Moleculon Research Corporation.

The extractant itself is an organic-soluble dithiophosphinic acid or the organic-soluble ammonium (wherein ammonium includes substituted ammonium such as morpholino, piperidino, tetrabutylammonium, and the like), alkali (e.g., Na, K, and the like) or alkaline earth metal (e.g., Ca, Mg, and the like) salt thereof. The free dithiophosphinic acids are preferred. However, if desired the aforementioned salts can be used with the ammonium, calcium or magnesium salt being preferred and the calcium salt being most preferred. Conveniently, the pure extractant can be used, in similar fashion to that described below for an extraction solvent, by contacting the extractant with the aqueous solution. When the extraction is complete the extractant phase is separated from the aqueous phase. The extracted metals are thereafter separated from the extractant by known techniques. However, it is generally preferred to employ an extraction solvent comprising from about 2 to 99 parts by volume of extractant with from about 98 to 1 parts by volume of a water-immiscible organic diluent, preferably from about 2 to 70 parts by volume of the extractant with from about 98 to 30 parts by volume of diluent. The extraction solvent may optionally contain from 1 to 15 parts by volume of a phase modifier to promote the separation of the phases and/or increase the solubility of the extracted salt metals in the organic phase. If a phase modifier is employed, the amount of organic diluent used should be reduced by a corresponding amount.

Generally, a wide variety of water-immiscible organic liquids may be used as the diluent. Suitable diluents include, but are not limited to, carbon tetrachloride, toluene, xylene, kerosene, naphtha, tridecanol, methylisobutylketone, tributylphosphate, cyclohexane, decane, pyridine, dibromoethane, and the like. Preferably, the diluent is an aliphatic or aromatic petroleum distillate. More preferably an aliphatic petroleum distillate is utilized. Suitable phase modifiers, when employed, include: tributylphosphate, tributylphosphine oxide, trioctylphosphine oxide, isodecanol, nonylphenol, and the like.

The organic-soluble dithiophosphinic acid or ammonium, alkali or alkaline earth metal salt thereof is represented by the formula:

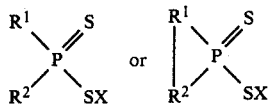

wherein $R^1$ and $R^2$ are the same or different and are selected from the group consisting of substituted or unsubstituted alkyl, cycloalkyl, alkoxyalkyl, alkycycloalkyl, aryl, alkylaryl, aralkyl and cycloalkylaryl radicals having from about 2-24 carbon atoms and X is either hydrogen or an ammonium, alkali or alkaline earth metal salt-forming radical. Preferably the organic-soluble thiophosphinic acid is diisobutyldithiophosphinic acid or di-2,4,4-trimethylpentyldithiophosphinic acid.

Representative organothiophosphinic acids include but are not limited to:

diethyl; di-n-propyl; diisopropyl; di-n-butyl; di-isobutyl; di-n-pentyl; di-n-hexyl; di-n-heptyl; di-n-octyl; di-n-nonyl; di-n-decyl; di-n-dodecyl; bis(2,4,4-trimethylpentyl); (2,4,4-trimethylpentyl) cyclohexyl; (2,4,4-trimethylpentyl) octyl; dicyclopentyl; dicyclohexyl; dicyclooctyl; cyclohexyl, n-butyl; cyclopentyl, n-dodecyl; cycloctyl ethyl; 2,4,6-triisopropyl-1,3,5-dioxaphosphorinane, 5-hydroxy, 5-oxide; cyclohexyl, phenyl; cyclopentyl-p-tolyl; cyclooctyl-p-chlorophenyl; diphenyl; di-o-tolyl; di-m-tolyl; di-p-tolyl; bis(2,3-dimethylphenyl); bis(2,4-dimethylphenyl); bis(2,5-dimethylphenyl); bis(2,6-dimethylphenyl); bis(3,4-dimethylphenyl); 3,5-dimethylphenyl); di-p-ethylphenyl); ethylphenyl; n-butylphenyl; n-octyl, phenyl; ethyl-o-tolyl; bis(o-chlorophenyl); bis(m-chlorophenyl); bis(p-chlorophenyl); methyl-o-chlorophenyl; n-propyl-p-chlorophenyl; n-dodecyl-p-chlorophenyl; dibenzyl; methyl-naphthyl; diallyl; cyclohexyl, 1-hydroxycyclohexyl; bis(2-methyl-1-hydroxyphenyl); benzyl, alpha-hydroxybenzyl; o-chlorobenzyl, alpha-hydroxy-o-chlorobenzyl; p-chlorobenzyl, alpha-hydroxy-p-chlorobenzyl; phenyl, alpha-methylbenzyl; cyclopentyl, 1-hydroxycyclopentyl; alpha-methylbenzyl, alpha-hydroxyl-alpha-methylbenzyl; 1-methylpentyl, 1-hydroxy-1-methylpentyl; n-octyl-alpha-hydroxybenzyl; (1-hydroxy-1-methylethyl)isopropyl. Additionally, mixtures of one or more of the organothiophosphinic acids may be employed.

In the processes of this invention, the metal bearing aqueous solution is contacted either batchwise, continuously co-current, continuously counter-current or continuously cross-current with the extraction solvent. The aqueous solution should have an equilibrium pH within the range of from about 0.2 to about 3.0 with about 0.4 to about 2.8 being preferred and about 0.5 to about 2.0 being most preferred. The ratio of aqueous to organic phase should be chosen to most effectively remove the selected metals. Aqueous to organic ratios of from 1:20 to 20:1 are believed to be effective, although other ratios may prove to be effective, depending upon the specific separation. Phase contact is commonly achieved in devices called "mixer-settlers", although many other types of devices are available and suitable. In the mixer, one phase is dispersed within the other by stirring or some other appropriate form of agitation. The extraction solvent then forms a complex with the metals to be extracted which reports to the organic phase of the two-phase liquid mixture. The dispersion then flows to the settler where phase disengagement occurs under quiescent conditions. Generally, extraction is carried out between 0°–80° C., preferably 20°–70° C. When diisobutyldithiophosphinic acid is employed, a temperature of about 20° to about 50° C. is preferred and when di-2,4,4-trimethylpentyldithiophosphinic acid is employed, a temperature of about 20° to about 50° C. is preferred.

The extracted metals may be separated from each other and recovered from the organic phase by known techniques. For example, by stripping with common mineral acids such as sulfuric acid, metric acid, hydrochloric acid, hydrobromic acid, hydrofluoric acid and the like.

It is to be understood that although much of the preceding disclosure relates to liquid-liquid extraction, the principles and properties are believed to extend to those other extraction techniques previously set forth.

The following examples are provided for the purposes of illustration only. The examples should not be construed as limiting the invention in any way as variations of the invention are possible which do not depart from the spirit and scope of the appended claims.

EXAMPLE 1

The following example illustrates the ability of diisobutyldithiophosphinic acid to separate zinc, copper, cobalt, and nickel from an aqueous solution also containing calcium under various conditions of pH.

To prepare the extraction solvent, diisobutyldithiophosphinic acid is dissolved in toluene to obtain a concentration of 5.4 vol %. The aqueous phase contains 0.5 gl$^{-1}$ Zn (II), 0.5 gl$^{-1}$ Cu (II), 0.5 gl$^{-1}$ Co (II), 0.5 gl$^{-1}$ Ni (II) and 0.5 gl$^{-1}$ Ca; all added as sulphate salts.

After the addition of a predetermined amount of either ammonium hydroxide or sulphuric acid, to control the pH, a 50 ml aliquot of the aqueous phase is contacted with an equal volume of the solvent for 5 minutes at 24° C. The aqueous phase is then separated from the solvent and analysed for the subject metals. Based upon the results obtained, the amount of metal extracted into the solvent is calculated by mass balance. The results obtained are shown in Table I.

TABLE I

| Equilibrium pH | % Metal Extraction | | | | |
|---|---|---|---|---|---|
| | Zn (II) | Cu (II) | Co (II) | Ni (II) | Ca (II) |
| 1.11 | 100 | 100 | 100 | 100 | 0 |
| 1.61 | 100 | 100 | 100 | 100 | 0 |
| 2.00 | 100 | 100 | 100 | 100 | 0 |

EXAMPLE 2

This example shows the ability of diisobutyldithiophosphinic acid to extract metals selectively from a solution containing a different alkaline earth element; magnesium.

The procedure of Example 1 is followed except that the concentration of the extractant in the solvent is now 4.1 vol % and the metals consist of Ag (I), Hg (II), Cd (II) and Mg (II) as their sulphate salts. The results obtained are shown in Table II.

TABLE II

| Equilibrium pH | % Metal Extracted | | | |
|---|---|---|---|---|
| | AG (I) | (Hg (II) | Cd (II) | Mg (II) |
| 0.29 | 100 | 100 | 100 | 0 |
| 1.11 | 100 | 100 | 100 | 5 |
| 1.63 | 100 | 100 | 100 | 5 |
| 2.55 | 100 | 100 | 100 | * |

*No analysis performed

EXAMPLE 3

This example shows the ability of di-2,4,4-trimethylpentyldithiophosphinic acid to extract zinc from a zinc solution under various conditions of pH. This example also shows that, under comparable conditions of pH, di-2,4,4-trimethylpentyldithiophosphinic acid does not extract calcium from a calcium solution. Di-2,4,4-trimethylpentyldithiophosphinic acid is dissolved in toluene to obtain a solvent containing 17.5 vol % of the extractant. After the addition of a predetermined quantity of ammonium hydroxide or sulphuric acid, to control pH, 50 ml of an aqueous solution containing 0.015 M Zn (II) as the sulphate salt is contacted for five minutes at 50° C. with an equal volume of the solvent. The aqueous phase is separated from the solvent and analysed for zinc. Based upon the results obtained, the amount of metal extracted into the solvent is calculated by mass balance The above procedure is repeated with the exception that the single-metal, aqueous sulphate solution contains Ca (II), instead of Zn (II), at the concentration of 0.015 M. The results obtained are shown in Table III.

TABLE III

| Zinc | | Calcium | |
|---|---|---|---|
| Equilibrium pH | % Extracted | Equilibrium pH | % Extracted |
| 0.41 | 99.9 | 0.62 | 0 |
| 0.91 | 100.0 | 1.11 | 0 |
| 1.42 | 100.0 | 1.50 | 0 |
| 1.67 | 100.0 | 2.06 | 0 |
| 1.87 | 100.0 | | |
| 2.35 | 97.5 | | |
| 2.70 | 94.8 | | |

COMPARATIVE EXAMPLE A

The procedure of Example 3 is followed except that di-2-ethylhexyldithiophosphoric acid is used as the extractant.

The results obtained are shown in Table IV.

TABLE IV

| Zinc | | Calcium | |
|---|---|---|---|
| Equilibrium pH | % Extracted | Equilibrium pH | % Extracted |
| 0.26 | 96.7 | 0.80 | 0 |
| 0.82 | 99.7 | 0.96 | 1.8 |
| 1.36 | 100.0 | 1.55 | 8.4 |
| 1.54 | 100.0 | 1.90 | 10.9 |
| 2.01 | 99.9 | | |

A comparison of the results obtained in Example 3 shows that the phosphinic acid is much more selective against calcium.

What is claimed is:

1. A process for the extraction of metals selected from the group consisting of zinc (II), silver (I), cadmium(II), mercury (II), nickel (II), cobalt (II), and copper (II) from an aqueous solution containing, in addition to said metals, metals selected from the group consisting of calcium (II) and magnesium (II) comprising contacting said solution having an equilibrium pH within the range of about 0.2 to about 3.0 with an extractant comprising an organicsoluble dithiophosphinic acid or ammonium, alkali or alkaline earth metal salt thereof represented by the formula:

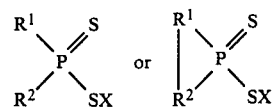

wherein $R^1$ and $R^2$ are the same or different and are selected from the group consisting of substituted or unsubstituted alkyl, cycloalkyl, alkoxyalkyl, alkylcycloalkyl, aryl, alkylaryl, aralkyl and cycloalkylaryl radicals having from about 2 to about 24 carbon atoms and X is either hydrogen or an ammonium, alkali or alkaline earth metal salt forming radical.

2. A process of claim 1 having the additional step of separating the aqueous phase from the extractant phase containing the extracted metals.

3. A process of claim 2 having the additional step of recovering the extracted metals from said extractant phase by stripping with a mineral acid.

4. A process of claim 1 wherein the extraction is conducted at a temperature in the range of about 0° to about 80° C.

5. A process of claim 1 wherein the pH is within the range of about 0.4 to about 2.8.

6. A process of claim 1 wherein said alkyl groups have about 4 to about 8 carbon atoms.

7. A process of claim 1 wherein said alkyl radicals are selected from the group consisting of isobutyl and 2,4,4-trimethylpentyl.

8. A process of claim 7 wherein the dithiophosphinic acid is diisobutyldithiophosphinic acid or di-2,4,4-trimethylpentyldithiophosphinic acid.

9. A process of claim 1 wherein the extraction is conducted at a temperature in the range of about 0° to 80° C., wherein the pH is within the range of about 0.4 to about 2.8 and wherein said alkyl groups have about 4 to about 8 carbon atoms.

10. A process of claim 9 wherein the dithiophosphinic acid is diisobutyldithiophosphinic acid.

11. A process of claim 9 wherein the dithiophosphinic acid is di-2,4,4-trimethylpentyldithiophosphinic acid.

12. A process for the extraction of metals selected from the group consisting of zinc (II), silver (I), cadmium (II), mercury (II), nickel (II), cobalt (II) and copper (II) from an aqueous solution containing, in addition to said metals, metals selected from the group consisting of calcium (II) and magnesium (II) comprising contacting said solution having a pH within the range of about 0.2 to about 3.0 with an extraction solvent at about 0° to about 80° C. and thereafter separating the aqueous phase from the extraction solvent phase containing the extracted metals, wherein said extraction solvent comprises:

(a) from about 2 to about 99 parts by volume of an organic-soluble dithiophosphinic acid or the ammonium, alkali or alkaline earth metal salt thereof represented by the formula:

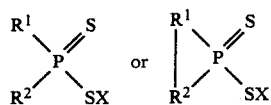

wherein $R^1$ and $R^2$ are the same or different and are selected from the group consisting of substituted or unsubstituted alkyl, cycloalkyl, alkoxyalkyl, alkylcycloalkyl, aryl, alkylaryl, aralkyl and cycloalkylaryl radicals having from about 2 to about 24 carbon atoms and X is either hydrogen or an ammonium, alkali or alkaline earth metal salt forming radical;

(b) from about 98 to 1 parts by volume of a water immiscible organic diluent; and (c) from 0 to about 15 parts by volume of a phase modifier.

13. A process of claim 12 wherein said dithiophosphinic acid is diisobutyldithiophosphinic acid.

14. A process of claim 12 wherein said dithiophosphinic acid is di-2,4,4-trimethylpentyldithiophosphinic acid.

15. A process of claim 12 wherein said extraction is of the metals Zinc (II), copper (II), cobalt (II) and nickel (II) from an aqueous solution containing said metals and calcium (II) and wherein said dithiophosphinic acid is diisobutyldithiophosphinic acid.

16. A process of claim 12 wherein said extraction is of the metals silver (I), mercury (II) and cadmium (II) from an aqueous solution containing said metals and magnesium (II) and wherein said dithiophosphinic acid is diisobutyldithiophosphinic acid.

17. A process of claim 12 wherein said extraction is of zinc (II) from an aqueous solution containing calcium (II) and zinc (II).

18. A process of claim 17 wherein the dithiophosphinic acid is diisobutyldithiophosphinic acid.

19. A process of claim 17 wherein the dithiophosphinic acid is di-2,4,4-trimethylpentyldithiophosphinic acid.

20. A process of claim 12 wherein said pH is in the range of about 0.4 to about 2.8.

21. A process of claim 12 having the additional step of recovering the extracted metals from said extraction phase by stripping with a mineral acid.

* * * * *